United States Patent
Qi et al.

(10) Patent No.: US 8,763,083 B2
(45) Date of Patent: Jun. 24, 2014

(54) METHOD, SUPER NODE-CORE (SN-C) NODE AND SYSTEM FOR REQUESTING AND STORING DISTRIBUTED SERVICE NETWORK (DSN) AUTHENTICATION INFORMATION

(75) Inventors: Minpeng Qi, Beijing (CN); Hongru Zhu, Beijing (CN); Qi Wu, Beijing (CN)

(73) Assignee: China Mobile Communications Corporation, Beijing (CN)

( * ) Notice: Subject to any disclaimer, the term of this patent is extended or adjusted under 35 U.S.C. 154(b) by 27 days.

(21) Appl. No.: 13/392,983

(22) PCT Filed: Aug. 17, 2010

(86) PCT No.: PCT/CN2010/076042
§ 371 (c)(1),
(2), (4) Date: Apr. 18, 2012

(87) PCT Pub. No.: WO2011/023070
PCT Pub. Date: Mar. 3, 2011

(65) Prior Publication Data
US 2012/0204226 A1  Aug. 9, 2012

(30) Foreign Application Priority Data
Aug. 28, 2009 (CN) .......................... 2009 1 0091817

(51) Int. Cl.
*G06F 21/00* (2013.01)
(52) U.S. Cl.
USPC ........ 726/3; 726/4; 726/11; 726/13; 455/411; 455/419; 455/423; 455/445
(58) Field of Classification Search
USPC .................... 726/2.3; 455/411, 419, 423, 445
See application file for complete search history.

(56) References Cited

U.S. PATENT DOCUMENTS 7,301,935 B1 * 11/2007 Chaturvedi et al. ........... 370/352
8,239,920 B2 *  8/2012 Nakazawa ........................ 726/2
(Continued)

FOREIGN PATENT DOCUMENTS

CN          1822548  A      8/2006
CN        101159745  A      4/2008
(Continued)

OTHER PUBLICATIONS

Forming Trust in Mobile Ad-Hoc Network; Baker et al; 2009 International Conference on Communications and Mobile Computing; IEEE computer society, Jan. 6-8, 2009.*
International Search Report mailed Nov. 25, 2010, for application No. PCT/CN2010/076042.

*Primary Examiner* — Jason Lee
(74) *Attorney, Agent, or Firm* — Workman Nydegger

(57) ABSTRACT

A method, Super Node-Core (SN-C) node and Distributed Service Network (DSN) authentication system for requesting and storing DSN authentication information are provided, wherein the method for requesting the DSN authentication information includes: according to a user access request, judging whether a local SN-C node stores the authentication information of the user; when the local SN-C node stores the authentication information, initiating an authentication process directly; when the local SN-C node does not store the authentication information, requesting the authentication information from other SN-C nodes which store the authentication information of the user. The method, SN-C node and DSN authentication system for requesting and storing the DSN authentication information, by means of the distributed storage and authentication of the authentication information of the user, can acquire the authentication information from other SN-C nodes when a failure occurs in one of the SN-C nodes, and reduce the risk that a single authentication server is unable to perform the authentication and operation caused by the failure.

6 Claims, 3 Drawing Sheets

(56) References Cited

U.S. PATENT DOCUMENTS

| | | |
|---|---|---|
| 2006/0282880 A1* | 12/2006 | Haverinen et al. ............... 726/3 |
| 2008/0083022 A1* | 4/2008 | Lee et al. ........................ 726/5 |
| 2008/0192634 A1* | 8/2008 | Kumar et al. ................ 370/235 |
| 2010/0144275 A1* | 6/2010 | Satou ........................... 455/41.2 |

FOREIGN PATENT DOCUMENTS

| | | |
|---|---|---|
| CN | 101183943 A | 5/2008 |
| CN | 101197753 A | 6/2008 |

* cited by examiner

METHOD, SUPER NODE-CORE (SN-C) NODE AND SYSTEM FOR REQUESTING AND STORING DISTRIBUTED SERVICE NETWORK (DSN) AUTHENTICATION INFORMATION

CROSS REFERENCE TO RELATED APPLICATIONS

The present application is a US National Stage of International Application No. PCT/CN2010/076042, filed 17 Aug. 2010, designating the United States, and claiming priority to Chinese Patent Application No. 200910091817.3 filed 28 Aug. 2009. Both of the aforementioned applications are incorporated herein by reference in their entirety.

FIELD

The present invention relates to a Distributed Service Network (DSN) technology and particularly to a method for requesting and storing DSN authentication information, an SN-C node and a DSN authentication system.

BACKGROUND

In the prior art, a solution in a single-key authentication mechanism in a communication network is generally an authentication solution based upon Authentication and Key Agreement (AKA), where a pre-shared key K is stored in a user and a corresponding Home Location Register (HLR)/Home Subscriber Server (HSS), the user accesses the network through a Visitor Location Register (VLR)/Mobility Management Entity (MME) or like; the VLR/MME requests an authentication vector from the HLR/HSS upon detection of the access of the user; the HLR/HSS generates and feeds an authentication vector back to the VLR/MME; and the VLR/MME authenticates the user against the authentication vector.

A primary drawback of the AKA authentication solution in the prior art lies in that only the specific HLR/HSS can generate and transmit an authentication vector to authenticate the user, and the user may fail to be authenticated when the HLR/HSS fails. Furthermore the existing AKA mechanism may not be applicable to a Peer to Peer (P2P) distributed network environment.

SUMMARY

A first object of the invention is to provide a method for requesting DSN authentication information to thereby lower such a risk that a single authentication server can not perform authentication or operate due to a failure thereof A second object of the invention is to provide a method for storing DSN authentication information to thereby lower such a risk that a single authentication server can not perform authentication or operate due to a failure thereof A third object of the invention is to provide a Super Node-Core (SN-C) node to thereby lower such a risk that a single authentication server can not perform authentication or operate due to a failure thereof A fourth object of the invention is to provide a DSN authentication system to thereby lower such a risk that a single authentication server can not perform authentication or operate due to a failure thereof To attain the first object of the invention, there is provided a method for requesting DSN authentication information, which includes: determining from a received access request of a user whether authentication information of the user is stored on a local SN-C node; and initiating directly an authentication process when the authentication information of the user is stored on the local SN-C node; or requesting the authentication information of the user from another SN-C node on which the authentication information of the user is stored when the authentication information is not stored on the local SN-C node.

To attain the second object of the invention, there is provided a method for storing DSN authentication information, which includes: determining the largest count of hops between two SN-C nodes, on which the same user authentication information is to be stored, from the largest time delay allowed by a DSN, an average time delay due to transmission between adjacent SN-C nodes and a network load and usage condition; and storing the same user authentication information on corresponding SN-C nodes according to the largest count of hops.

To attain the third object of the invention, there is provided an SN-C node including: a receiving module configured to receive an access request of a user; a storing module configured to store authentication information of the user and information on SN-C nodes on which the same authentication information of the user is stored; a determining module configured to determine from an access request of the user whether the authentication information of the user is stored in the storing module; an authenticating module configured to initiate directly an authentication process when the authentication information of the user is stored in the storing module; and a requesting module configured to request the authentication information of the user from another SN-C node on which the authentication information of the user is stored when the authentication information is not stored on the local node.

To attain the fourth object of the invention, there is provided a DSN authentication system including: several SN-C nodes arranged in a loop, each configured to determine from a received access request of a user whether authentication information of the user is stored on the local SN-C node, and to initiate directly an authentication process when the authentication information of the user is stored on the local SN-C node or request the authentication information of the user from another SN-C node on which the authentication information of the user is stored when the authentication information is not stored on the local SN-C node.

In the methods for requesting and storing DSN authentication information, the SN-C node and the DSN authentication system according to the invention, authentication information of a user is stored and authenticated in a distributed way, so that when one of the SN-C nodes fails, the authentication information can also be acquired from another SN-C node to thereby lower such a risk that a single authentication server can not perform authentication or operate due to a failure thereof Moreover the count of hops between SN-C nodes, on which the same authentication information is stored, is preset to ensure that a period of time required for an authentication process will not exceed the largest time delay allowed by a DSN and to alleviate an authentication failure situation due to authentication time-out, thus improving the experience of the user.

DETAILED DESCRIPTION

The invention will be described in details with reference to the drawings.

Embodiment of Storing Method

Figure 1:
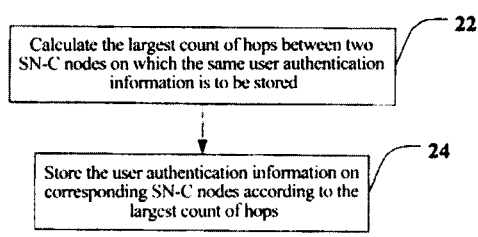
FIG. 1 is a flow chart of a method for storing DSN authentication information according to an embodiment of the invention.

As illustrated in FIG. 1, an embodiment of a method for storing DSN authentication information according to the invention includes the following operations 22 and 24.

The operation 22 is to calculate the largest count of hops between two SN-C nodes on which the same user authentication information is to be stored.

In the present embodiment, the largest count n of hops between two SN-C nodes, on which the same user authentication information is to be stored, is determined from the largest time delay T allowed by a DSN, an average time delay t due to transmission between adjacent SN-C nodes and a network load and usage condition. For example, if the largest time delay T allowed by the DSN is 200 ms, the average time delay t due to transmission between adjacent SN-C nodes is 30 ms and there is a normal network load and usage condition, that is, an online SN-C node on which the user authentication information is stored can be located in the DSN after an average number n=2 of single authentication processes, then the largest count n of hops is calculated as:

$$(T/t/n)*2-1=(200\ ms/30\ ms/2)*2-1 \approx 5.$$

Thus it can be ensured that a user node connected with any SN-C node can locate the closest SN-C on which authentication information of the user node is stored and which is spaced by no more than (200 ms/30 ms/2) 3 nodes.

Figure 6:
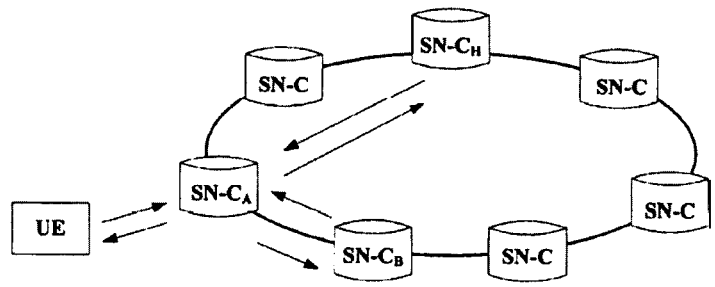
FIG. 6 is a structural diagram of a DSN authentication system according to the invention.

The operation 24 is to store the user authentication information on corresponding SN-C nodes according to the largest count of hops until the distance between any SN-C nodes throughout a routing loop on which the same authentication information is stored is no more than a selected count of hops. As illustrated in FIG. 6, for example, the same user authentication information is stored on nodes $SN-C_B$ and $SN-C_H$.

In the present embodiment, the user authentication information is stored in a distributed way throughout the routing loop, and a related authentication server includes the user authentication information strictly consistent with the user authentication information that a neighbor authentication server includes, thus the UE to be authenticated may not necessarily search for a specific home server, but instead a corresponding accessed $SN-C_A$ is responsible for initiating a request to another SN-C node on which the user authentication information is stored.

Preferably, for example, the corresponding accessed $SN-C_A$ is responsible for initiating a request to an SN-C node at the shortest distance thereto on which the user authentication information is stored, or the corresponding accessed $SN-C_A$ is responsible for initiating a request to an online SN-C node at a shorter distance on which the user authentication information is stored.

Thus when one of the SN-C nodes fails, the authentication information can also be acquired from another SN-C node to thereby lower such a risk that a single authentication server can not perform authentication or operate due to a failure thereof. Moreover the count of hops between SN-C nodes, on which the same authentication information is stored, is preset to ensure that a period of time required for an authentication process will not exceed the largest time delay allowed by the DSN and to alleviate an authentication failure situation due to authentication time-out, thus improving the experience of the user.

In a method for requesting DSN authentication information according to an embodiment of the invention, firstly it is determined from a received access request of a user whether authentication information of the user is stored on a local SN-C node, and if the result of determination is Yes, then an authentication process is initiated directly; otherwise, then the authentication information of the user is requested from an SN-C node on which the authentication information is stored. Particularly the authentication information of the user can be requested from an SN-C node on which the authentication information is stored by requesting the authentication information directly from an SN-C node which is at the shortest routing distance to the local node and on which the authentication information of the user is stored or by requesting the authentication information from an online SN-C node which is at a shorter routing distance to the local node and on which the authentication information of the user is stored to thereby improve a success ratio of acquiring the authentication information. A detailed description will be given below respectively in a first embodiment of the requesting method and a second embodiment of the requesting method.

First Embodiment of Requesting Method

Figure 2:
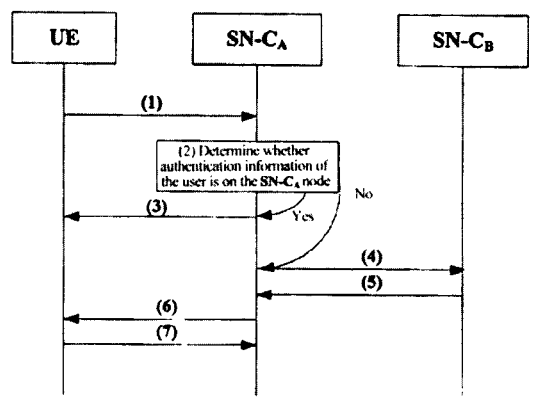
FIG. 2 is a flow chart of a method for requesting DSN authentication information according to a first embodiment of the invention.

As illustrated in FIG. 2, the first embodiment of the method for requesting DSN authentication information according to the invention particularly includes the following operations:

(1) A UE requests an access to a network and transmits home server network information to the connected $SN-C_A$;

(2) The $SN-C_A$ determines whether authentication information of the user is stored locally, and if so, then an operation (3) is executed; otherwise, an operation (4) is executed;

(3) The $SN-C_A$ initiates directly an authentication process to authenticate the UE;

(4) The authentication information of the user is required from an SN-C node, $SN-C_B$, which is at the shortest routing distance to the local node and on which the authentication information is stored;

(5) The $SN-C_B$ returns the authentication information to the $SN-C_A$;

(6) The $SN-C_A$ initiates an authentication request to the UE according to the authentication information; and (7) The UE performs authentication in response to the authentication request and generates and transmits an authentication response to the $SN-C_A$, and the $SN-C_A$ authenticates the UE according to the authentication response.

In the present embodiment, the authentication information of the user is authenticated in a distributed way throughout the routing loop, and the UE to be authenticated may not necessarily search for a specific home server, but instead the corresponding accessed $SN-C_A$ is responsible for initiating a request to another SN-C node at the shortest distance thereto on which the authentication information of the user is stored. Thus when one of the SN-C nodes fails, the authentication information can also be acquired from another SN-C node to thereby lower such a risk that a single authentication server can not perform authentication or operate due to a failure thereof Moreover the count of hops between SN-C nodes, on which the same authentication information is stored, is preset to ensure that a period of time required for an authentication process will not exceed the largest time delay allowed by the DSN and to alleviate an authentication failure situation due to authentication time-out, thus improving the experience of the user.

Second Embodiment of Requesting Method

Figure 3:
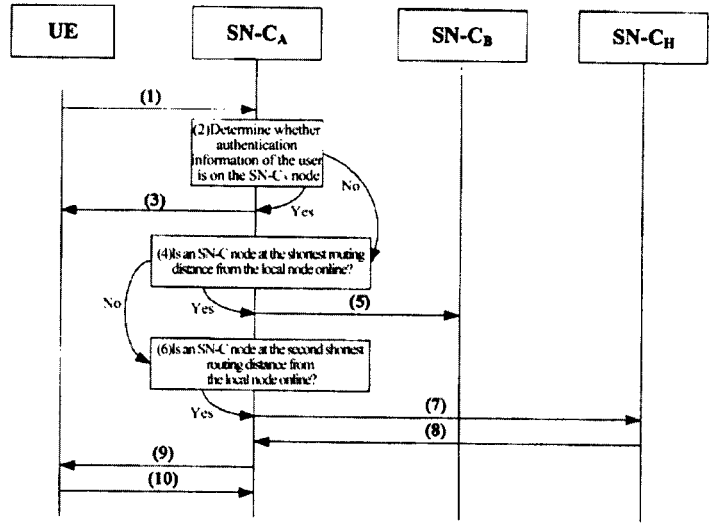
FIG. 3 is a flow chart of a method for requesting DSN authentication information according to a second embodiment of the invention.

As illustrated in FIG. 3, the second embodiment of the method for requesting DSN authentication information according to the invention particularly includes the following operations:

(1) to (3) are the same as in the first embodiment of the requesting method, and a repeated description thereof will be omitted here;

(4) The $SN-C_A$ determines whether another SN-C node, which is at the shortest routing distance to the local node and on which the authentication information of the user is stored, is online. For example, a node, which is at the shortest routing distance to the local node and on which the authentication information of the user is stored, is the $SN-C_B$ in the present embodiment, and it is determined whether the $SN-C_B$ is online, and if it is online, then the $SN-C_A$ performs an operation (5); otherwise, then the $SN-C_A$ performs an operation (6);

(5) The authentication information is requested from the $SN-C_B$;

(6) The $SN-C_A$ determines whether another SN-C node, which is at the second shortest routing distance to the local node and on which the authentication information of the user is stored, is online, for example, the $SN-C_H$ in the present embodiment; if it is not online, then the $SN-C_A$ continues with searching for another SN-C node on which the authentication information of the user is stored until an online SN-C node, which is at a shorter routing distance to the local node and on which the authentication information of the user is stored, is located to request the authentication information; and if it is online, the $SN-C_A$ performs an operation (7);

(7) The $SN-C_A$ requests the authentication information from the $SN-C_H$;

(8) The $SN-C_H$ returns the authentication information to the $SN-C_A$;

(9) The $SN-C_A$ initiates an authentication request to the UE according to the authentication information; and

(10) The UE performs authentication in response to the authentication request and generates and transmits an authentication response to the $SN-C_A$, and the $SN-C_A$ authenticates the UE according to the authentication response.

In the present embodiment, online detection is performed on an SN-C node on which the authentication information of the user is stored to thereby avoid requesting the authentication information from an offline SN-C node, thus lowering a time delay resulting from those unnecessary operations.

Third Embodiment of Requesting Method

The third embodiment of the method for requesting DSN authentication information according to the invention further includes: counting a period of time for the entire process of searching for an SN-C node and requesting the authentication information; and aborting the authentication process when the period of time exceeds the largest time delay allowed by the DSN to thereby end up with authentication failure.

In the present embodiment, the period of time for an authentication process is limited to thereby avoid an influence of a too long period of time for authentication upon both the operation of the network and the experience of the user.

First Embodiment of Device

Figure 4:
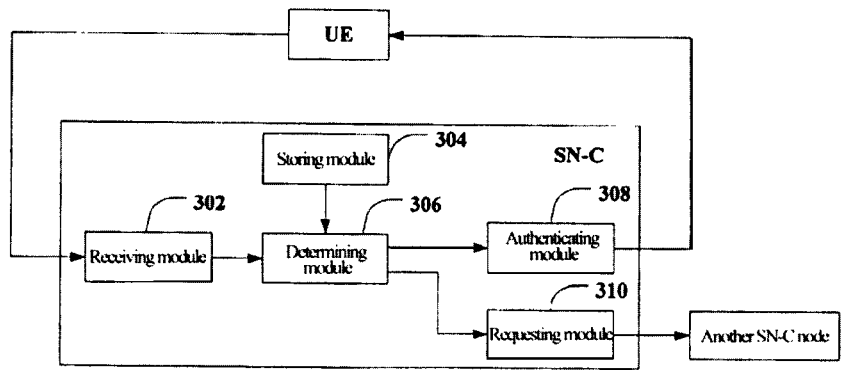
FIG. 4 is a structural diagram of an SN-C node device according to a first embodiment of the invention.

As illustrated in FIG. 4, the first embodiment of an SN-C node device according to the invention includes:

a receiving module 302 configured to receive an access request of a user;

a storing module 304 configured to store authentication information of the user and information on other SN-C nodes on which the same user authentication information as the SN-C node is stored;

a determining module 306 configured to determine from the access request of the user whether the authentication information of the user is stored in the storing module;

an authenticating module 308 configured to initiate directly an authentication process when the authentication information of the user is stored in the storing module; and a requesting module 310 configured to request the authentication information of the user from another SN-C node on which the authentication information of the user is stored when the authentication information is not stored on the local node.

Preferably the requesting module 310 requests the authentication information of the user from an SN-C node which is at the shortest routing distance from the local node and on which the authentication information of the user is stored when the authentication information is not stored on the local node.

In the present embodiment, the authentication information of the user is authenticated in a distributed way throughout a routing loop, and the UE to be authenticated may not necessarily search for a specific home server, but instead a corresponding accessed SN-C is responsible for initiating a request to another SN-C node at the shortest distance thereto on which the authentication information of the user is stored. Thus when one of the SN-C nodes fails, the authentication information can also be acquired from another SN-C node to thereby lower such a risk that a single authentication server can not perform authentication or operate due to a failure thereof Moreover the count of hops between SN-C nodes, on which the same authentication information is stored, is preset to ensure that a period of time required for an authentication process will not exceed the largest time delay allowed by a DSN and to alleviate an authentication failure situation due to authentication time-out, thus improving the experience of the user.

A specific authentication process of the device in the present embodiment has been detailed in the embodiment of the requesting method, and a repeated description thereof will be omitted here.

Second Embodiment of Device

Figure 5:
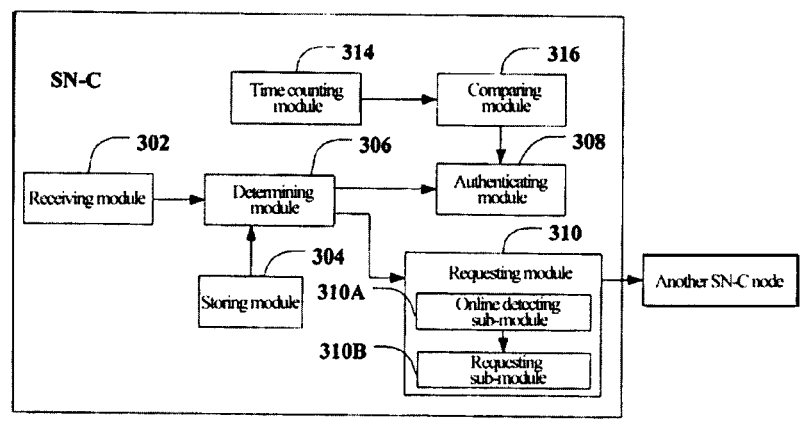
FIG. 5 is a structural diagram of an SN-C node device according to a second embodiment and a third embodiment of the invention.

In the second embodiment of the SN-C node device according to the invention as illustrated in FIG. 5, the requesting module 310 in the first embodiment of the device particularly includes:

an online detecting sub-module 310A configured to detect whether an SN-C node, which is at the shortest routing distance to the local node and on which the authentication information of the user is stored, is online; and a requesting sub-module 310B configured to request the authentication information of the user from the SN-C node which is at the shortest routing distance to the local node and on which the authentication information of the user is stored when the SN-C node, which is at the shortest routing distance to the local node and on which the authentication information is stored, is online; or to select the next SN-C node which is at the second shortest routing distance to the local node and on which the authentication information of the user is stored and instruct the online detecting sub-module to detect an online status thereof until the online detecting sub-module selects an online SN-C node on which the authentication information of the user is stored, and request the authentication information of the user from the selected SN-C node when the SN-C node, which is at the shortest routing distance to the local node and on which the authentication information is stored, is not online.

In the present embodiment, online detection is performed on an SN-C node on which the authentication information of the user is stored to thereby avoid requesting the authentication information from an offline SN-C node, thus lowering a time delay resulting from those unnecessary operations.

A specific authentication process of the device in the present embodiment has been detailed in the embodiment of the requesting method, and a repeated description thereof will be omitted here.

Third Embodiment of Device

As illustrated in FIG. 5, the third embodiment of the SN-C node device according to the invention further includes:

a time counting module 314 configured to count a period of time for the entire authentication process; and a comparing module 316 configured to compare the period of time for the entire authentication process with the largest time delay allowed by a DSN The authenticating module 308 is further configured to return authentication failure information when the period of time for the entire authentication process exceeds the largest time delay allowed by the DSN.

In the present embodiment, the period of time for an authentication process is limited to thereby avoid an influence of a too long period of time for authentication upon both the operation of the network and the experience of a user.

A specific authentication process of the device in the present embodiment has been detailed in the embodiment of the requesting method, and a repeated description thereof will be omitted here.

Embodiment of System

As illustrated in FIG. 6, the embodiment of a DSN authentication system according to the invention includes:

several SN-C nodes arranged in a loop each configured to determine from a received access request of a user whether authentication information of the user is stored on the local SN-C node, and to initiate directly an authentication process when the authentication information of the user is stored on the local SN-C node or request the authentication information of the user from another SN-C node on which the authentication information of the user is stored when the authentication information is not stored on the local SN-C node.

A specific authentication process of the system in the present embodiment has been detailed in the embodiment of the requesting method, and a repeated description thereof will be omitted here.

In the DSN authentication system of the present embodiment, the authentication information of the user is stored and authenticated in a distributed way, so that when one of the SN-C nodes fails, the authentication information can also be acquired from another SN-C node to thereby lower such a risk that a single authentication server can not perform authentication or operate due to a failure thereof Moreover the count of hops between SN-C nodes, on which the same authentication information is stored, is preset to ensure that a period of time required for an authentication process will not exceed the largest time delay allowed by a DSN and to alleviate an authentication failure situation due to authentication time-out, thus improving the experience of the user.

It shall be noted that the foregoing embodiments are intended to illustrate but not limit the invention, and the invention will not be limited to the foregoing examples, but any technical solutions and adaptations without departing from the spirit and scope of the invention shall be encompassed in the scope of claims of the invention.

The invention claimed is:

1. A method for requesting Distributed Service Network, DSN, authentication information, comprising:

determining from a received access request of a user whether authentication information of the user is stored on a local Super Node-Core, SN-C, node; and initiating directly an authentication process when the authentication information of the user is stored on the local SN-C node; or requesting the authentication information of the user from another SN-C node on which the authentication information of the user is stored when the authentication information is not stored on the local SN-C node, wherein authentication fails when the authentication information is not requested successfully within a largest time delay of a DSN.

2. The method for requesting DSN authentication information according to claim 1, wherein the requesting the authentication information of the user from another SN-C node on which the authentication information of the user is stored comprises:

requesting the authentication information of the user from an SN-C node which is at the shortest routing distance to the local node and on which the authentication information of the user is stored.

3. The method for requesting DSN authentication information according to claim 1, wherein the requesting the authentication information of the user from another SN-C node on which the authentication information of the user is stored comprises:

detecting whether an SN-C node, which is at the shortest routing distance to the local node and on which the authentication information of the user is stored, is online;

requesting the authentication information of the user from the SN-C node which is at the shortest routing distance to the local node and on which the authentication information is stored when the SN-C node, which is at the shortest routing distance to the local node and on which the authentication information is stored, is online; and selecting an SN-C node which is at the second shortest routing distance to the local node and on which the authentication information of the user is stored and detecting whether the selected node is online until an online SN-C node, on which the authentication information of the user is stored, is selected, and requesting the authentication information of the user from the selected SN-C node, when the SN-C node, which is at the shortest routing distance to the local node and on which the authentication information of the user is stored, is not online.

4. A local Super Node-Core, SN-C, node, comprising:

a receiving module configured to receive an access request of a user;

a storing module configured to store authentication information of the user and information on SN-C nodes on which the same authentication information of the user as the local SN-C node is stored;

a determining module configured to determine from the access request of the user whether the authentication information of the user is stored in the storing module;

an authenticating module configured to initiate directly an authentication process when the authentication information of the user is stored in the storing module;

a requesting module configured to request the authentication information of the user from another SN-C node on which the authentication information of the user is stored when the authentication information is not stored on the local SN-C node;

a time counting module configured to count a period of time for the entire authentication process; and a comparing module configured to compare the period of time for the entire authentication process with a largest time delay of a DSN; and wherein, the authenticating module is further configured to return authentication failure information when the period of time for the entire authentication process exceeds the largest time delay of the DSN.

5. The local SN-C node according to claim 4, wherein the requesting module is configured:

to request the authentication information of the user from an SN-C node which is at the shortest routing distance from the local SN-C node and on which the authentication information of the user is stored when the authentication information is not stored on the local SN-C node.

6. The local SN-C node according to claim 4, wherein the requesting module comprises:

an online detecting sub-module configured to detect whether an SN-C node, which is at the shortest routing distance to the local SN-C node and on which the authentication information of the user is stored, is online; and a requesting sub-module configured to request the authentication information from the SN-C node which is at the shortest routing distance to the local SN-C node and on which the authentication information of the user is stored when the online detecting sub-module detects that the SN-C node, which is at the shortest routing distance to the local SN-C node and on which the authentication information of the user is stored, is online; or to select the next SN-C node which is at the second shortest routing distance to the local SN-C node and on which the authentication information of the user is stored and instruct the online detecting sub-module to detect an online status thereof until the online detecting sub-module selects an online SN-C node on which the authentication information of the user is stored, and request the authentication information of the user from the selected SN-C node, when the SN-C node, which is at the shortest routing distance to the local SN-C node and on which the authentication information is stored, is not online.

* * * * *